Dec. 26, 1939.   H. E. ROCKEFELLER ET AL   2,184,562
PROCESS OF FLAME-CUTTING METAL
Filed May 29, 1937   2 Sheets-Sheet 1

INVENTORS
HARRY E. ROCKEFELLER
JOHN H. ROUNTREE
BY *Greenewald*
ATTORNEY

Dec. 26, 1939.     H. E. ROCKEFELLER ET AL     2,184,562
PROCESS OF FLAME-CUTTING METAL
Filed May 29, 1937     2 Sheets-Sheet 2

INVENTORS
HARRY E. ROCKEFELLER
JOHN H. ROUNTREE
BY
ATTORNEY

Patented Dec. 26, 1939

2,184,562

UNITED STATES PATENT OFFICE 2,184,562

PROCESS OF FLAME-CUTTING METAL

Harry E. Rockefeller, Rye, N. Y., and John H. Rountree, Elizabeth, N. J., assignors to The Linde Air Products Company, a corporation of Ohio Application May 29, 1937, Serial No. 145,470

17 Claims. (Cl. 148—9)

This invention relates to the art of cutting metal, and more particularly to processes of precision flame-cutting metal plates, bars, and the like, at relatively high speeds.

Under modern methods of fabrication, use is extensively made of relatively large sheets or plates of metal which are welded together during assembly to form an integral structure. When such welding operations are employed for large-scale fabrication, as for ship building and in the construction of railway cars, large conduits, tanks, and penstocks, the plates employed are often over 40 feet long and from ¼ to 4 inches thick, and it becomes essential that they be shaped to the required dimensions as rapidly and economically as possible. It is often desirable, when shaping such plates, that the edges be simultaneously squared and bevelled or scarfed to prepare them for the welding operation.

The principal objects of the present invention are to provide a process of flame-cutting metallic bodies at a considerably higher rate of speed than was heretofore possible; to provide an improved process wherein an oxidizing jet forming a cut in a ferrous metal body is so positioned as to more effectively preheat the uncut portions; to provide a process of flame-cutting metal at a relatively high speed for a given quality of the finished edge or edges; to provide an improved process of flame-cutting a metal plate during a single pass so as to form an edge composed of two intersecting faces; to provide a process of bevelling the wall of a kerf by means of an uninterrupted oxidizing jet; to provide a process of forming a squared-off edge substantially free from slag; and to provide in all of the above processes a correlated action between the respective jets such as to obtain most efficient results. These and other objects of the invention will become apparent from the following description and from the accompanying drawings, in which:

Flame-cutting ordinarily is practiced by projecting a jet of oxygen substantially perpendicularly to the surface of a properly preheated metal body, and advancing the jet relatively to the body. No noticeable reaction takes place unless the metal has first been raised to the ignition temperature, so that proper preheating of the metal is an essential part of any flame-cutting operation. If the temperature of the entire body of metal is raised before the oxygen jet is applied, the cutting operation proceeds at a faster rate than when the usual local preheat is applied to a cold body of metal. It is generally recognized that the rate at which such a cut may be advanced is limited by the rate at which the uncut portion can be preheated to react with the oxygen jet. Ordinarily the cutting jet is surrounded by a plurality of oxy-fuel gas flames which locally preheat the surface of the metal adjacent to the cutting jet. If the cutting jet is advanced over the metal body faster than the surface can be brought to the ignition temperature, the oxidizing reaction ceases and the cut is "lost."

The forward motion of the cutting nozzle relatively to the metal tends to cause the cutting stream to lag in its passage through the body, the lag being represented by the horizontal distance between the point of entry and the point that the jet emerges from the under surface of the body. The degree of lag increases with the forward speed of the cut so that if the speed becomes excessive, the lag increases to such a point that the oxygen jet no longer penetrates entirely through the body. It will be seen, therefore, that the rate of flame-cutting is definitely limited by the preheat rate and by the degree of lag which can be tolerated while still producing a complete cut.

Heretofore, the speed of flame-cutting has further been limited for a given thickness of workpiece by the inability of a cutting jet to form square and smooth edge surfaces when the rate of travel becomes excessive. Therefore, even though ample preheat is applied, as by heating the entire body in a furnace and/or surrounding the cutting jet with oversize local preheat flames, and even though the metal plate is sufficiently thin so that excessive lag is avoided, the flame-cutting speed must be limited in order to produce smooth, square edge surfaces which are satisfactory for industrial fabrication.

Figure 5:
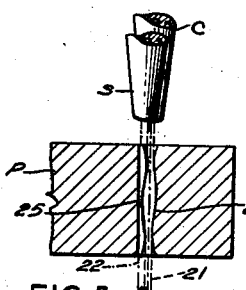
Fig. 5 is a cross sectional view through the workpiece as taken on the line 5—5 of Fig. 4.
Figure 7:
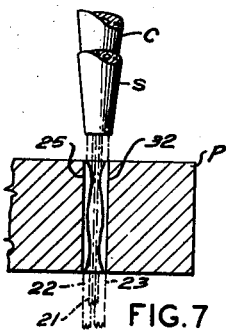
Fig. 7 is a cross sectional view through the workpiece as taken on the line 7—7 of Fig. 6.

By the present invention, relatively high cutting speeds may be employed to obtain smooth, plane edges through the use of tandem cutting jets. One manner of carrying out the invention is disclosed in Figs. 1 and 2 wherein a conventional cutting nozzle C projects a jet of oxygen 21 substantially vertically against the top face of a steel plate or body P at sufficiently high velocity to form a severing kerf entirely through the body. By providing sufficient preheat, the cut is advanced at a rate in excess of the maximum at which smooth flat surfaces may be formed, and the edges of the kerf are concurrently trimmed by a second cutting jet. The extra amount of preheat necessary for the increased cutting rate is supplied in part by the exothermic heat from each cutting jet which assists in maintaining a uniform action of the other. Otherwise, plate P may be initially preheated by previously heating the entire plate P as in a furnace, or through the use of very large local preheating flames surrounding the jet 21. If the cutting operation is performed as an intermediate step during the hot rolling of the plate P, no additional preheat may be necessary. The jet 21 is advanced relatively to the plate P in the direction indicated by the arrow at a substantially higher speed than that formerly customary for the particular thickness of plate, thereby producing a kerf 24 having walls so irregular and rough as to be unsatisfactory for ordinary fabricating purposes. A smoothing or trimming nozzle S is positioned substantially parallel with the nozzle C and is arranged so as to direct a jet of oxygen 22 through the kerf 24 behind the jet 21. The jets 21 and 22 are substantially coplanar, although the smoothing jet 22 is preferably shifted or offset slightly laterally from the centerline of the kerf so as to be directed transversely of the irregular surface of one wall of the kerf 24, planing a relatively thin layer from the same to form a smooth flat wall 25 as the jets 21 and 22 are moved in unison. The jet 22 preferably is arranged to remove a layer of metal at least $\tfrac{1}{16}$ inch thick from the wall of the kerf 24 to insure complete elimination of all irregularities, but the thickness of the trimmed layer is dependent upon the degree of roughness of the kerf wall. In other words, the cross-section of the trimming jet is commensurate with the maximum deviation of the irregular kerf wall from a plane surface, as shown in Figs. 5 and 7. If desired, the jet 22 may be shifted slightly, for example, from 1° to 5° from the vertical in a plane extending transversely of the kerf. In accordance with this process, plates, which preferably are preheated, may be flame-cut at rates considerably higher than were heretofore possible, and the finished edges possess the qualities of smoothness and squareness necessary for subsequent commercial use or treatment.

Under some conditions, it may not be possible to advance the cutting jets at the desired speed because of excessive lag, or failure to raise the temperature of the uncut surface to the ignition point. These limitations have been overcome by the present invention through the use of a cutting jet which is inclined forwardly with respect to its motion relatively to the metal body. The degree of inclination depends somewhat upon the rate of travel and upon the thickness of the body to be cut. An angle of substantially 60° with the surface of the work has been found to be desirable for metal plates ranging in thickness from ½ inch to 3 inches although this angle may vary from 50° to 85° without detracting appreciably from the results.

Figure 3:
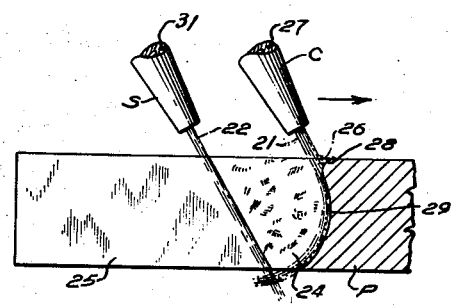
Fig. 3 is a longitudinal sectional view through a workpiece similar to Fig. 1, showing the respective nozzles inclined forwardly.
Figure 4:
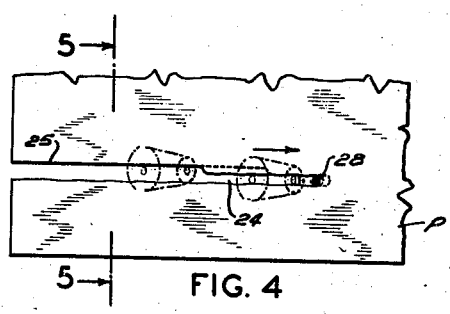
Fig. 4 is a plan view of the arrangement illustrated in Fig. 3.

As indicated in Figs. 3, 4, and 5, the cutting nozzle C is positioned so that the jet 21 is projected forwardly and downwardly against the top surface of the plate P. By thus inclining the nozzle C, the preheating jets which issue from the nozzle orifices 27 also play forwardly over the surface of the uncut portion of the plate P, effectively raising the zone to the ignition temperature. It has been found that when the jet of cutting oxygen 21 is directed against this preheated zone in a downward and forward direction, a low velocity fringe 26 of the jet is deflected forwardly over the preheated surface, forming a shallow groove 28 by an oxidation action. The molten products of the reaction are urged forwardly over the adjacent uncut portion by the kinetic energy of the fringe 26, assisting in the preheating action, while the exothermic heat resulting from the oxidization of the metal within the groove 28 further aids in raising the metal to the ignition temperature, as more fully described and claimed in R. S. Babcock and J. M. Gaines application Serial No. 125,212, filed February 11, 1937. All of these factors contribute to raising the upper surface of the plate P to the ignition temperature rapidly and efficiently, enabling the cutting jet 21 to be advanced at a rate faster than would otherwise be possible. Furthermore, by inclining the cutting jet in the direction of travel, the forward component thereof counteracts the lagging tendency of the jet. By thus increasing the preheat rate, and decreasing the degree of lag, the cut may be advanced at a rate far in excess of that heretofore obtainable with conventional methods. For example, with ½ inch mild steel plates, ignition has been maintained and plates have been severed with this process at as high a rate as 125 inches per minute, or more than five times the highest speed recommended in current trade publications. Another advantage to be obtained by inclining the cutting jet forwardly resides in the turbulent action of the jet with the leading edge 29 of the kerf 24 as the jet 21 is diverted rearwardly. The cutting jet thus scours the leading edge of the kerf, the kinetic energy of the stream agitating the slag, which further enhances the oxidization reaction, and encourages the flow of molten reaction products toward and through the bottom side of the kerf. By inclining the nozzle, the reaction zone tends to occupy a cavity forward of and beneath the point of entry of the jet, so additional preheating of the uncut portions of the metal may be provided by the proximity of the reaction zone.

The actual speeds obtainable with the inclined cutting jet for a particular thickness and grade of metal are best determined by experiment. For a given inclination of the cutting nozzle C, the rate at which the jet 21 may be advanced with respect to the plate P is largely determined by the angle at which the jet emerges from the under side of the plate. Assuming that the preheat is sufficient to maintain the cut, the highest rate of advance has been found to occur when the jet emerges substantially parallel with the bottom surface of the plate.

At the high cutting speeds rendered possible through the use of the inclined cutting jet, the walls of the kerf 24 are often somewhat irregular and rough to such an extent that they do not come within the tolerances ordinarily prescribed for fabrication purposes. Whenever it is desired to obtain smooth, flat edge faces at the increased cutting speed, use may be made of a smoothing jet 22 projected from a nozzle S spaced from, and preferably inclined substantially parallel to the cutting nozzle C. The jet 22 is preferably disposed to one side of the central plane of the kerf a distance no greater than is necessary to trim or plane a wall of the kerf 24 to form a smooth, flat edge 25. The kerf-smoothing jet 22 is preferably advanced along and through the newly formed hot kerf 24 concurrently with, and immediately behind the jet 21. The spacing between the respective jets is to be maintained at a minimum in order that the oxidization action of each jet may provide exothermic heat to assist in obtaining a uniform cutting action of the other jet. However, the jets should be spaced apart sufficiently so as not to cause undesirable interaction. For example, the jet 22 may display a tendency to move globules of slag forwardly along the top surface of the plate P to a point where such globules would interfere with the proper cutting action of the jet 21. Also, if the rearwardly extending portion of the jet 21 should intersect the jet 22 at any point within the body of the metal plate P, a turbulent inter-action occurs which prevents the jet 22 from exercising the proper smoothing action upon the wall of the kerf 24. Accordingly, for most efficient results, the nozzles C and S are preferably separated by a distance which permits the two respective jets 21 and 22 to intersect at a point immediately below the bottom surface of the plate P. At the high operating speed obtainable, the newly formed walls of the kerf 24 may not have cooled to below the ignition temperature when acted upon by the jet 22, but in order to more fully insure uniformity of action, additional preheating flames may be positioned between the jets 21 and 22, or the usual oxy-fuel gas mixture may pass through orifices 31 to provide preheating flames about the jet 22. Attempts to trim the kerf after the walls thereof have once cooled appreciably from the cutting operation result in a consequent reduction in trimming speed and deterioration in the quality of the trimmed edge. The smoothing jet 22 may tend to limit the rate at which the cutting jet 21 can be advanced, so that if the two jets are to be advanced concurrently in fixed spaced relation, the speed of the entire operation may be somewhat reduced from that attainable by the inclined cutting jet alone. With the jets arranged as shown in Fig. 3, cutting speeds of 84 inches per minute have been obtained on ½ inch thick mild steel plate, which speed is considerably in excess of speeds obtained with conventional flame-cutting methods producing edges of similar quality on plate of the same steel and thickness.

It is generally recognized that the quality of a cut, that is, its smoothness and flatness, and freedom from rounded top and bottom edges, improves as the cut-propagating rate is diminished. This rule applies as well to the present process.

By advancing the cutting and smoothing jets on ½ inch thick mild steel plate at the reduced speed of, for example, 36 inches per minute, a quality of surface and contour is obtained which is superior to that of conventional cutting at 18 inches per minute. Edges thus obtainable are of such high quality that they resemble surfaces formed by machine grinding from the standpoint of smoothness and squareness.

Figure 1:
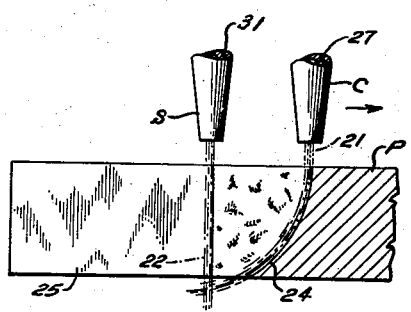
Fig. 1 is a longitudinal sectional view through a metal workpiece showing a pair of flame-cutting nozzles operating in tandem.
Figure 2:
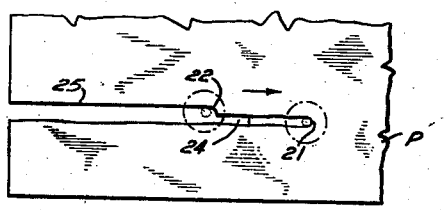
Fig. 2 is a plan view of the arrangement shown in Fig. 1, with the nozzles indicated in broken lines.
Figure 6:
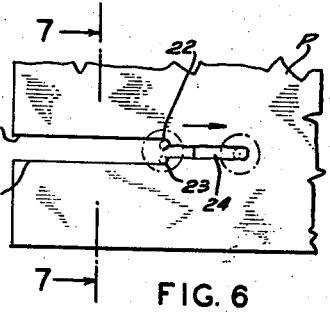
Fig. 6 is a plan view indicating the manner in which three oxygen cutting jets may be applied to form a kerf.

Under certain conditions, it may be desirable when practicing processes disclosed in either Figs. 1 or 3, to smooth and trim both walls of the kerf so that two square smooth edge faces 25 and 32 are formed, in the event that both parts of the severed plate are to be utilized. As indicated in Figs. 6 and 7, this result may be obtained by employing a pair of smoothing jets 22 and 23, each of which is positioned slightly to one side of the central plane of the kerf 24 so as to smooth, trim, or plane the opposite walls thereof. Similar results might be obtained by employing a single centrally located smoothing jet 22 which is sufficiently wide in cross section to act on both walls of the kerf, but the use of two spaced jets, as shown in Fig. 6, is more economical. Undesirable interaction between the two jets 22 and 23 may be avoided by tilting the nozzles to produce a kerf that diverges slightly toward the bottom of the plate, with an included angle between the walls, for example, of from 1° to 5°.

Figure 8:
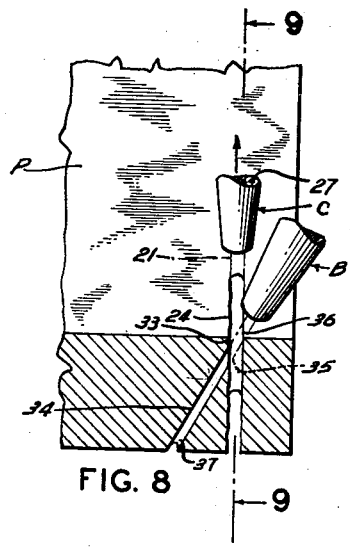
Fig. 8 is a perspective view showing an arrangement of oxygen jets for cutting and bevelling.
Figure 9:
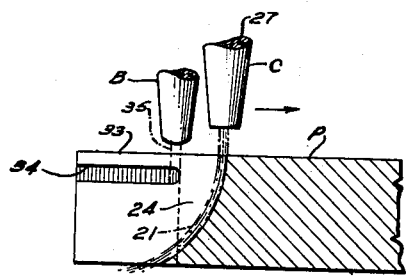
Fig. 9 is a longitudinal cross sectional view through the workpiece taken on the line 9—9 of Fig. 8.

Flame-cutting a metal plate so as to form an edge composed of two faces in intersecting planes may be accomplished by shifting the smoothing or trimming jet to a diagonal position transversely with respect to the kerf. In the arrangement shown in Figs. 8 and 9, a cutting nozzle C projects an oxidizing jet against the preheated top surface of a metal plate P. The jet 21 is advanced with respect to the plate P in the direction indicated by the arrow so as to form a kerf 24, the wall 33 of which forms one of the faces of the edge and is square with the top plate surface. The remaining edge face 34 intersects the face 33 within the thickness of the metal and is formed by positioning a bevel nozzle B so as to direct an oxidizing jet 35 diagonally through and across an open side 36 for example, the top of the kerf 24, so that the jet 35 continues obliquely through the wall 33 without being interrupted or intercepted by any portion of the opposite wall of the kerf. The jet 35 is advanced with respect to the plate P concurrently with and behind the jet 21, thus producing the diagonally disposed kerf 37, the wall 34 of which constitutes the bevel face of the plate edge. If desired, the jet 35 may be of slightly smaller cross section than that of the jet 21 so that it may strike the face 33 at a greater depth from the top surface of the plate P, the jet velocity being sufficiently high that the jet continues through the plate from the point of impingement to the bottom of the plate. The angle at which the nozzle B is disposed away from the plane of the kerf 24 may be varied according to the thickness of the plate employed but ordinarily is within the range of from 15° to 30°. By projecting the jet 35 uninterruptedly against the face 33, that is, through the open side 36 of the kerf 24 without abutting the opposite wall, no undesirable deflection of the jet ensues and the face 34 is formed smooth and plane. The jet 35 is positioned as close as possible behind the jet 21 without causing interference between the two, so that the heat generated by one jet assists in maintaining a uniform action of the other.

Figure 10:
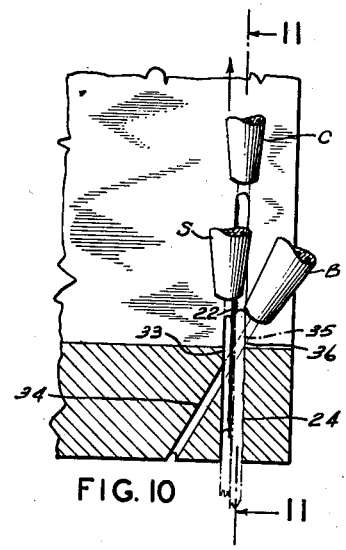
Fig. 10 is a perspective view of another arrangement of oxygen jets for cutting and bevelling.
Figure 11:
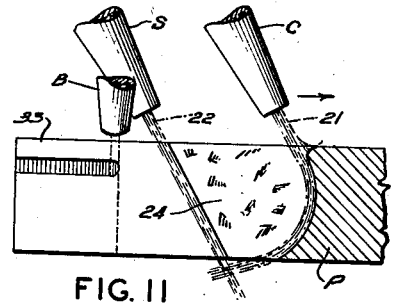
Fig. 11 is a longitudinal cross sectional view through the workpiece as taken on the line 11—11 of Fig. 10.

Better and quicker results may be obtained with the arrangement indicated in Figs. 10 and 11. As shown in the drawings, use is made of a cutting nozzle C and a smoothing nozzle S inclined forwardly in the manner shown in Figs. 3 and 4. The operation of the jets 21 and 22 indicated in Figs. 10 and 11 is identical with the operation of such jets as described in connection with Figs. 3 and 4. A bevelling nozzle B of the type shown in Figs. 8 and 9 follows immediately behind the smoothing nozzle S and is positioned diagonally with respect to the plane of the kerf 24 so that the jet 35 emerging from the nozzle traverses the open side 36 of the kerf 24 and strikes the opposing face 33 without being deflected by the opposite wall of the kerf. With this arrangement, the smoothing jet 22 trims the squared-off face 33, and at the same time widens the kerf 24 permitting a greater range of adjustment for the bevel nozzle B. The edge 33, as shown in Fig. 10, is therefore subjected to two planing operations, one of which trims and smooths the wall in a plane substantially parallel to the kerf, and the other of which planes the wall 33 diagonally. If it is desired to form a single plane face on one wall of the kerf 24, the nozzle B may be positioned substantially coplanar with the nozzles S and C in such a manner that the rough cutting operation is performed by the jet 21, while two planing or smoothing operations are successively performed by the respective jets 22 and 35, each jet removing a thin slice from one of the kerf walls. With this arrangement, the smoothing may be performed more rapidly, and the rate of travel of the concurrently-moving three jets increased.

Figure 12:
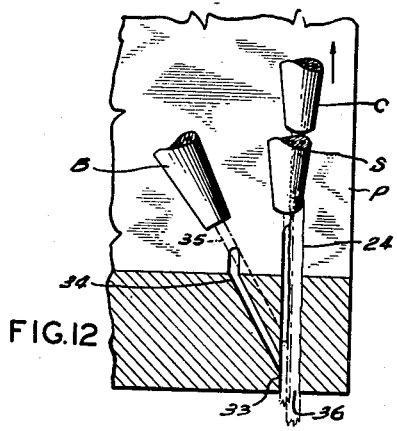
Fig. 12 is a perspective view showing another arrangement of oxygen jets for cutting and bevelling.

Fig. 12 discloses an arrangement which is similar to that shown in Figs. 10 and 11 with the exception that the bevelling nozzle B is positioned so as to direct the jet 35 initially upon the top surface of the plate P. In either case, the jet 35 traverses the kerf 24 diagonally and passes through the open side 36 thereof uninterruptedly, that is, without intercepting the metal of the opposite wall. It will be observed that in Fig. 12 a squared-off face 33 is formed adjacent to the bottom surface of the plate, and the bevelled face 34 faces upwardly, whereas in Figs. 10 and 11 the squared-off face 33 is formed adjacent to the upper plate surface and the bevel face is undercut. In some instances, the procedure employed as shown in Figs. 10 and 11, has some advantage over that shown in Fig. 12 in that when the bevelled edges are employed for welding, it is desirable that the squared-off edge 33 be smooth, flat, and free from slag adhesions. By forming the squared-off face adjacent to the upper plate surface and prior to the formation of the bevelled face, there is less likelihood of slag adhering to it as a result of the flame-cutting operations.

Various modifications of the foregoing processes may be employed without departing from the principles of the invention or sacrificing any of its advantages, as we contemplate any process properly within the scope of the appended claims.

We claim:

1. In the process of cutting metal wherein an oxidizing jet is advanced relatively to the metal to be cut at such a speed that the resulting kerf walls are left irregular and rough; the step comprising concurrently advancing a smoothing jet of oxidizing gas along and substantially aligned with the central plane of the kerf at a point behind said first jet to trim a thin layer from one of said walls, said smoothing jet having a cross-section substantially equal to the maximum deviation of said irregular wall from a plane surface.

2. A process of cutting a metallic body at high speed, comprising advancing a jet of oxidizing gas relatively to a preheated surface of the metallic body to form a kerf therein; concurrently advancing a second jet along said kerf to smooth a wall thereof; and positioning the respective jets relatively close to one another so that exothermic heat from one assists in maintaining a uniform action of the other, but spacing said jets sufficiently so that upon merging from the opposite surface of the metallic body the jets intersect at a point immediately outside the body.

3. A process of cutting a metallic body at high speed comprising directing a pair of generally parallel and substantially coplanar oxidizing jets downwardly against a surface of said body; concurrently moving said jets with respect to said body along the line of cutting, whereby the first jet forms a kerf, and the second jet follows within said kerf and trims one wall thereof; maintaining the speed of relative movement sufficiently high that the leading jet emerges from the under surface of said body in a rearward direction; and maintaining sufficient spacing between the respective jets so that they intersect at a point immediately beneath said body.

4. In the process of cutting metal wherein a high-velocity oxidizing jet is directed against and advanced relatively to a body of metal to form a kerf therein; the step comprising inclining such advancing jet forwardly, and maintaining the rate of relative travel sufficiently high that the direction of flow of said jet is reversed by the leading edge of said kerf, and so that said jet upon emerging from the opposite side of said body of metal is inclined rearwardly, and is substantially parallel with the surface of the metal from which said jet emerges.

5. In a process of cutting metal at high speed wherein a first high-velocity oxidizing jet is directed against and advanced relatively to a body of metal to form a kerf therein, and a second oxidizing jet is concurrently advanced through and along said kerf to remove metal from and smooth a wall thereof; the steps comprising inclining said first advancing jet forwardly to such an extent that the direction of flow of said jet is reversed by the leading edge of said kerf, said first jet upon emerging thereby being inclined rearwardly; inclining said second jet forwardly to a position substantially parallel with the undeflected portion of said first jet; and maintaining the spacing between said respective jets such that they intersect at a point immediately beyond the surface from which they emerge.

6. A process of flame-cutting a metal plate to form an edge having a pair of intersecting faces, which process comprises concurrently advancing a pair of spaced oxidizing jets relative to said plate, the first of said jets forming a first kerf, one wall of which forms the first of said faces, the other of said jets projecting diagonally through an open side of said kerf and passing uninterruptedly through said first face, said other jet thereby forming a second kerf, one wall of which forms the second of said faces.

7. A process of flame-cutting a metal plate as claimed in claim 6 wherein the first of said jets is of larger cross-section than the other jet.

8. A process of flame-cutting a metal plate to form an edge having a square face and a bevel face, comprising concurrently advancing two spaced oxidizing jets relatively to said plate, the first of said jets being directed against the upper surface of said plate to form a kerf therein one wall of which forms said square face, the second of said jets being directed diagonally downward across the upper open side of said kerf and passing through said square face to thereby form said bevel face.

9. A process of flame-cutting a metal body to form an edge having a pair of intersecting faces, which comprises concurrently advancing a plurality of oxidizing jets relatively to said body, the first of said jets forming a kerf in said body, the second of said jets trimming a wall of said kerf to form one of said faces, the third of said jets projecting diagonally through an open side of said kerf and continuing through the trimmed wall to form the other of said faces.

10. A process of bevelling a vertical wall of a flame-cut kerf comprising advancing a stream of oxidizing gas along and through the newly-formed hot kerf to widen the same, and concurrently therewith advancing an oxidizing jet projected along and diagonally downward through the top of the widened kerf against one of the vertical walls of said kerf, said second jet impinging against said vertical wall at a point below the top thereof.

11. A process of flame-cutting a metal plate at high speed to form an edge composed of two intersecting faces, which method comprises advancing a forwardly-inclined oxidizing jet at such high speed that a kerf with uneven walls is formed; concurrently advancing behind said jet and within said kerf a second oxidizing jet for trimming and smoothing one of the walls of said kerf to form one of said faces; and concurrently advancing a third oxidizing jet along said kerf, said third jet being directed diagonally through an open side of said kerf against the smoothened wall thereof and continuing through said wall to form the second of said faces.

12. A process of flame-cutting a metal plate at high speed to form an edge composed of a square face and a bevel face, which method comprises projecting an oxidizing jet against and in a plane perpendicular to the top surface of said plate; advancing said jet along said surface at such a high speed that a severing kerf having irregular but substantially parallel walls is formed; concurrently advancing a second oxidizing jet through said kerf substantially coplanar with said first-mentioned jet to remove metal from and smooth one of the walls of said kerf to thereby form said square face and to widen said kerf; and immediately behind said second-mentioned jet advancing a third oxidizing bevelling jet projected diagonally downward, said third jet passing diagonally across an open side of said widened kerf, said third jet also passing downwardly through successive portions of the smoothed wall adjacent to said open side of said kerf to form said bevel face.

13. A process of flame-cutting metal at high speed comprising advancing a first oxidizing jet relatively to the metal at such high speed that a kerf having rough and uneven walls is formed; and concurrently therewith advancing a plurality of mutually spaced oxidizing kerf-smoothing jets along said kerf, each of said latter jets being substantially parallel with said first jet, and being offset slightly laterally at no greater distances from the centerline of said kerf than is necessary to remove in successive relatively thin layers the rough and uneven portions of at least one of the walls of said kerf.

14. A process of flame-cutting a metal plate at high speed to form an edge composed of a square face and a bevel face, which process comprises projecting an oxidizing jet against and in a plane substantially perpendicular to the top surface of said plate; advancing said jet with respect to said surface at such a high speed that a kerf having uneven substantially parallel walls is formed; concurrently advancing a second oxidizing jet along said kerf substantially aligned with said first-mentioned jet to remove metal from and smooth one of the walls of said kerf to thereby form said square face and to widen said kerf; and immediately behind said second-mentioned jet advancing an oxidizing jet projected diagonally downward against the top surface and through the lower portion of the smoothed wall of said kerf to form said bevel face, said last-mentioned jet emerging through the open bottom side of said widened kerf.

15. A process of bevelling a metal plate comprising projecting an oxidizing jet against and in a plane perpendicular to the top surface of said plate; advancing said jet progressively along said plate to form a kerf therein; concurrently therewith advancing along said kerf an oxidizing bevelling jet projected downwardly into the top of said kerf obliquely against one wall of said kerf, said second jet passed uninterruptedly against and through said wall at a point below said top surface and continuing to the opposite side of said plate.

16. A process for rapidly severing a plate of ferrous metal and simultaneously bevelling at least one edge formed by the severing operation, said process comprising applying a heating jet and an oxidizing jet from blowpipe means against one face of said plate while maintaining the relative movement of said blowpipe means and said plate at a sufficiently high rate that said oxidizing jet penetrates entirely through said plate to the opposite face thereof and produces a severing kerf having irregular walls concurrently advancing another oxidizing jet along said kerf behind the first oxidizing jet while directing such other jet into the top of said kerf and obliquely against one of the irregular surfaces of the wall of said kerf, and maintaining the velocity of said other jet sufficiently high to penetrate from its point of impingement through said plate to the other face thereof, said other jet being located sufficiently close to the first oxidizing jet so that the heat generated by the oxidizing action of one oxidizing jet assists the oxidizing action of the other oxidizing jet to rapidly sever said plate and simultaneously bevel the flame-cut edge of one of the severed pieces.

17. A process of flame-cutting metal, comprising advancing an oxidizing cutting jet relatively to the metal at high speed to produce a kerf therein having substantially parallel rough side walls; and concurrently therewith advancing a pair of oxidizing kerf-smoothing jets along said kerf, all of said jets being sufficiently close together that the heat generated by the oxidizing action of each jet assists in maintaining a uniform oxidizing action of the remaining jets, said smoothing jets being disposed transversely on opposite sides of the center of said kerf a distance no greater than is necessary to trim the rough portions from said walls.

HARRY E. ROCKEFELLER.
JOHN H. ROUNTREE.